Jan. 22, 1963
R. BECKER
3,074,245
PROCESS FOR THE SELECTIVE REMOVAL OF CARBON DIOXIDE
AND HYDROGEN SULFIDE FROM GASEOUS MIXTURES
CONTAINING THE SAME
Filed June 16, 1958
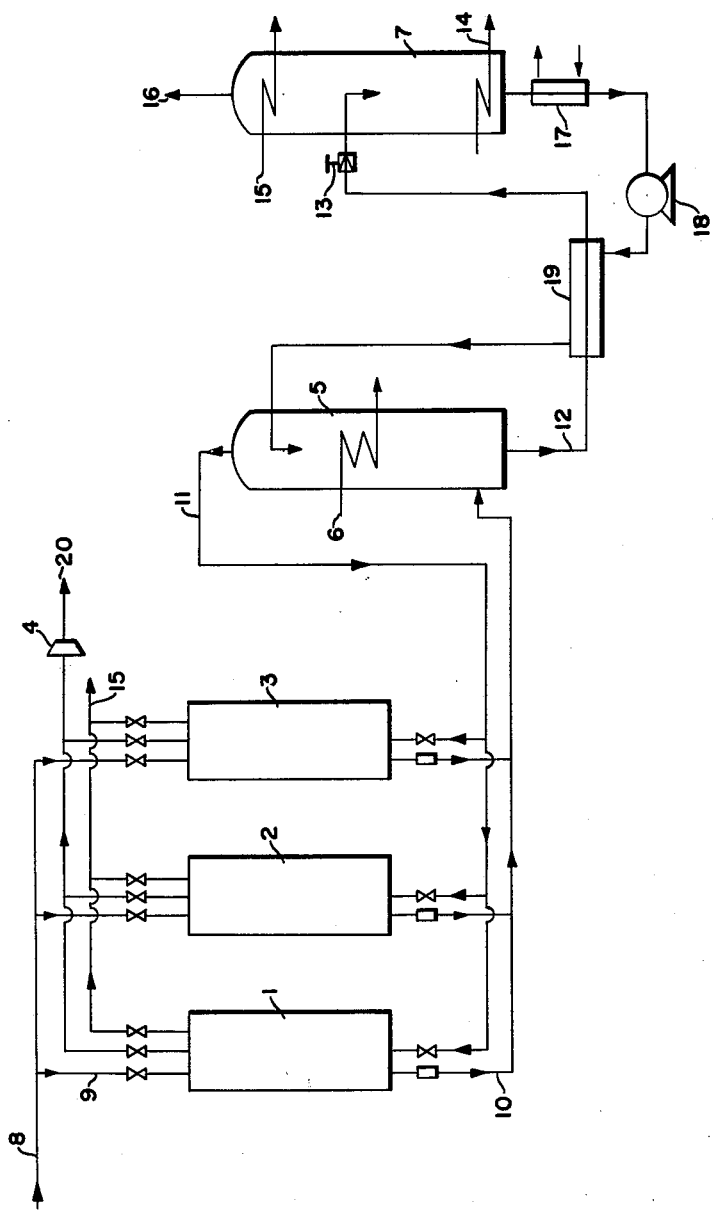
INVENTOR
RUDOLF BECKER
BY *Pierce, Scheffler & Parker*
*his* ATTORNEYS United States Patent Office 3,074,245
Patented Jan. 22, 1963

3,074,245
PROCESS FOR THE SELECTIVE REMOVAL OF CARBON DIOXIDE AND HYDROGEN SULFIDE FROM GASEOUS MIXTURES CONTAINING THE SAME
Rudolf Becker, Munich-Solln, Germany, assignor to Gesellschaft für Linde's Eismaschinen Aktiengesellschaft, Hollriegelskreuth, near Munich, Germany, a German company
Filed June 16, 1958, Ser. No. 742,019
Claims priority, application Germany July 18, 1957
7 Claims. (Cl. 62—12)

The present invention relates to the selective removal of constitutents, for example, carbon dioxide and hydrogen sulfide, from gaseous mixtures containing the same together with other gaseous components.

A number of processes are now in use for effecting such removal, for example, washing with water under pressure or with caustic alkali solution. It is also known to separate carbon dioxide and hydrogen sulfide from crude gases by washing and simultaneous rectification at low temperatures, preferably between −30° and −70° C., in several stages, where the wash liquid can also be regenerated by rectification (see, for example, German Patents Nos. 907,928; 929,808; and 935,144).

The disadvantage of the known processes is that they are comparatively expensive and require large amounts of wash liquid. This becomes more and more unfavorable as the proportion of carbon dioxide in the crude gas increases. In particular, both the carbon dioxide and hydrogen sulfide were, in the above mentioned low-temperature processes, removed by the aid of a washing agent, and the hydrogen sulfide obtained was greatly contaminated with carbon dioxide. In order to separate the carbone dioxide from the mixture, large amounts of the washing agents were required, which condition resulted in great cold losses. Moreover, considerable amounts of the washing agent were lost with the carbon dioxide. The contaminated carbon dioxide was unsuitable for certain uses, with the result that it was partly lost also, or else it had to be purified at considerable expense.

Another known process for removing carvon dioxide from gases consists in conducting the gas through a regenerator and freezing out the carbon dioxide.

But there carbon dioxide and hydrogen sulfide are separated together in the regenerator, so that no selective separation of these two constituents is achieved.

A selective separation of the carbon dioxide from a crude gas containing carbon dioxide and ethylene in the regenerator was achieved (see German Patent No. 885-844) by carrying out the cooling of the regenerators only to the respective dew point of the ethylene in the crude gas, the dew point being determined by the working pressure and the ethylene concentration. But since carbon dioxide is generally also obtained in such a process in liquid form in the regenerator, any hydrogen sulfide—in the case, for example, where both carbon dioxide and hydrogen sulfide are present and are to be separated—would be dissolved in the liquid carbon dioxide and hence would be retained with the liquid $CO_2$ in the regenerator The selectivity is, therefore, incomplete in this case.

According to the present invention, the process for the selective removal of carbon dioxide and hydrogen sulfide, from gases containing the same, by means of a regenerative arrangement is based on the utilization of the different dew points of these two substances. The present process is characterized, in particular, in that the regenerator system is operated at such pressures and temperatures that before the reversal all of the carbon dioxide present is separated out in solid form on the storage mass, while at the cold end the dew point of the hydrogen sulfide is not attained. Surprisingly, the carbon dioxide so separated in solid form in the regenerator is free from hydrogen sulfide. The hydrogen sulfide subsequently can be washed out by means of a wash liquid.

The invention has the advantage that it requires only a minimum of wash liquid, since only one component, namely, the more easily soluble constituent $H_2S$ is separated by means of a washing process, and that there are practically no losses in the regeneration. The advantage is particularly obvious when large amounts of carbon dioxide, for example, up to 30 or 40%, are contained in the starting gas and must be removed before the gases are used. In these technical gases the carbon dioxide obtained with the conventional methods could not be used technically and could not even be blown off into the air because of its bad odor.

According to the process of the present invention, a regenerator is cooled to such an end temperature that the gas to be treated assumes at the cold end a temperature at which hydrogen sulfide is not yet condensed. Thereby, practically only carbon dioxide is separated, and its separation is practically complete in the regenerator.

If the partial pressure of the carbon dioxide is so high that liquid carbon dioxide is also obtained, hydrogen sulfide (if present) will be dissolved in the latter. This situation can be avoided, according to a special embodiment of the invention, by selecting a decomposition pressure such that no carbon dioxide is separated in liquid form. With a portion of 30% $CO_2$, for example, the total pressure must not exceed 17.6 atm., so that the partial pressure is not higher than the triple point pressure of 5.28 atm. abs. But in a situation where the pressure of the gas to be decomposed is fixed by the type of its production and where it is unavoidable that the partial pressure of the carbon dioxide constituent is higher than the triple point pressure, a part of the liquid carbon dioxide, according to another feature of the invention, is evaporated by reduction of the total pressure of the gas mixture, i.e., by reduction of the partial pressure of the carbon dioxide before the regenerators are reversed to solidify the residual part of the liquid carbon dioxide. Hydrogen sulfide is dissolved in the liquid carbon dioxide. When the liquid carbon dioxide solidifies the so-dissolved $H_2S$ is expelled at the same time. Pressure relief can be effected by closing the valve at the hot end (through which the gas to be decomposed enters), the valve at the cold end remaining open. Another possibility is that at least one of the above mentioned valves is connected to a container in which is contained either the gas to be decomposed or a neutral gas of lower pressure, for example, atmospheric pressure; the valve not connected to the container being closed before or at the same time. This container can be another regenerator whose storage mass is in the regenerated state.

Gas which is not condensable, during the phase of reduction of the partial pressure of the carbon dioxide, in the temperature range of the regenerator preferably is conducted through the regenerator to prevent premature separation of hydrogen sulfide. This gas—for example, nitrogen—can be used at the same time to remove valuable constituents of the original gas mixture by scavenging, for example, hydrogen or carbon monoxide from the regenerator. The scavenging gas preferably is conducted through the regenerator from the hot to the cold end.

With a $CO_2$ proportion of about 30% and a partial pressure of 9 atm., the separation in the regenerator may be, and preferably is, carried out at about 30 atm. abs.

It is within the framework of the inventive concept to remove from a gaseous starting mixture other constituents, with different dew points, contained therein. In such case, also, a part of the admixture is separated in a regenerator, or in a regenerator system, whose temperature is above the dew points of the remaining constituents. The removal of the remaining constituents is then effected—as indicated—by a washing process or any other process which may be known in itself, for example, by additional cooling.

The system of the present process is illustrated in the accompanying drawing, in which the single figure is a diagrammatic representation of an apparatus arrangement operable for use in carrying out the process.

In the drawing, 1, 2, and 3 represent three regenerators, 5 represents a wash column, 7 represents a regenerating column, and 6 represents a cooling coil.

A raw gas, having the approximate composition:

| | Percent |
|---|---|
| $CO_2$ | 30.0 |
| $H_2S$ | 0.5 |
| and Mixture of $H_2$, $N_2$, CO and $CH_4$ | 69.5 | is supplied through conduit 8 at a pressure of about 20 atmospheres, and, through a suitable arrangement of valved conduits, is introduced into regenerator 1 wherein a part of the content of $CO_2$ is separated out in solid form. The exit gas from regenerator 1, which contains $H_2S$, inert gases and part of the original $CO_2$ content, and is at a temperature of about 185° Kelvin, is conducted by way of conduit 10 to and through the wash column 5 wherein it is washed with a suitable wash liquid, e.g., methanol. The inert gases, associated with about 2% $CO_2$, pass through conduit 11 to and through regenerator 3 and exit from the system, at 15, at about the temperature of the surrounding atmosphere.

The wash liquid which has collected in wash column 5 is withdrawn from the latter through conduit 12 and passed through a heat exchanger 19, wherein it is warmed, and thence, by way of throttle valve 13, into regenerating column 7. The sump of column 7 is indirectly heated by means of steam passing through a heating coil arrangement 14, whilst the uppermost part of column 7 is indirectly cooled by means of cooling water passing through a cooling coil 15. There is withdrawn from the top of column 7, by way of conduit 16, a mixture of about 60% $H_2S$ and about 40% $CO_2$, of which the $H_2S$ concentration is suitable for the recovery of sulfur or $H_2SO_4$. The washing liquid collecting at the foot of regenerating column 7 is withdrawn therefrom and through a water cooler 17, and, by means of a pump 18, is forced through heat exchanger 19 and to the top of wash column 5.

In the described phase of the cycle, in which regenerator 1 is loaded and the inert gases are warmed in regenerator 3, the separated $CO_2$ contained in regenerator 2 is, with the aid of vacuum pump 4 vaporized and, discharged at a pressure of about 0.1 atmosphere through exit pipe 20.

I claim:
1. In a process for the selective removal of two gaseous constituents having different boiling points from a gas mixture containing these constituents and another gas by means of reversing regenerators in which one constituent of lower boiling point is initially contained in essentially greater concentration than another constituent of higher boiling point and in which the higher boiling constituent is substantially volatile upon the freezing of the lower boiling constituent, the method which comprises cooling said gas mixture in a regenerator to a temperature slightly above the boiling point of the higher boiling constituent at its partial pressure in the gas mixture for condensing the greatest part of the lower boiling constituent.

2. Process according to claim 1, in which after condensation of the carbon dioxide in the regenerator a gas which is not condensable at the temperature prevailing in the regenerator is conducted over the storage mass of said regenerator from the warm end to the cold end of said mass.

3. Process according to claim 1, in which the constituents remaining in the gas mixture after the condensation of the greatest part of the lower boiling constituent, preferably the higher boiling constituent, is separated subsequently by scrubbing with a wash liquid to produce a residual gas mixture.

4. Process according to claim 3, in which the decomposition pressure of the gas mixture within the regenerator arrangement is so selected that the partial pressure of the carbon dioxide in the gas mixture is lower than the triple point pressure of 5.28 atm. abs.

5. Process according to claim 3 for the selective removal of carbon dioxide with a partial pressure initially higher than the triple point pressure in which the carbon dioxide is in a first period separated in the regenerator arrangement at least partly in liquid form and in a second period at least partly solidified by reduction of the partial pressure of the carbon dioxide.

6. Process for the selective removal of carbon dioxide and hydrogen sulfide from a gas mixture containing the same in association with at least one other gas having a dew point lower than that of carbon dioxide by means of a regenerator arrangement, the relation of the amount of the carbon dioxide to the amount of the hydrogen sulfide being initially preferably greater than 4 to 1, in which the regenerator is operated at a temperature lower than 217° K. at the cold end for condensing the greatest part of the carbon dioxide but the dew point of hydrogen sulfide in relation to its partial pressure is not attained at the cold end of the regenerator for preventing the dissolution of hydrogen sulfide in non-gaseous carbon dioxide.

7. Process according to claim 6, in which hydrogen sulfide subsequently is removed from the residual gas mixture exiting from the regenerator by scrubbing the residual gas mixture with a wash liquid in which hydrogen sulfide is soluble.

References Cited in the file of this patent

UNITED STATES PATENTS

| 2,217,678 | Goosman | Oct. 15, 1940 |
| 2,270,852 | Schuftan | Jan. 27, 1942 |
| 2,572,933 | Houvener | Oct. 30, 1951 |
| 2,664,719 | Rice et al. | Jan. 5, 1954 |
| 2,738,658 | Bronson | Mar. 20, 1956 |